United States Patent
Gregory et al.

(12)

(10) Patent No.: US 6,289,097 B1
(45) Date of Patent: Sep. 11, 2001

(54) METHOD AND SYSTEM FOR A REDIRECT REPEATER PROVIDING NETWORK ACCESS

(75) Inventors: Thomas B. Gregory, Trout Valley; Eric V. Erickson, Mt. Prospect; James A. Renkel, Warrenville; Christopher J. Rozman, Kildeer; John M. Sullivan, Lisle, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/087,834

(22) Filed: May 29, 1998

(51) Int. Cl.[7] .................................................. H04M 11/00
(52) U.S. Cl. ........................................... 379/338; 370/352
(58) Field of Search .................................... 379/338, 211, 379/210, 219, 93.07; 370/352

(56) References Cited

U.S. PATENT DOCUMENTS 6,084,873 * 9/2000 Russell et al. ..................... 379/93.14
6,115,460 * 9/2000 Crowe et al. ......................... 379/219

* cited by examiner

*Primary Examiner*—Stella Woo
(74) *Attorney, Agent, or Firm*—McDonnell Boehnen Hulbert & Berghoff

(57) ABSTRACT

A method and device for providing telephone subscribers serviced from digital loop carrier ("DLC") systems access to a computer network. The described device includes a redirect repeater with the capability to redirect multiplexed channels of the DLC to a computer network. The redirect repeater is interfaced to the DLC and redirects channels of the multiplexed DLC system to the computer network in response to a redirect signal. The described method includes monitoring the DLC for a call origination message indicating a subscriber is originating a telephone call, buffering messages from the originating telephone call and recognizing a redirect signal indicating the telephone call is to be directed to the computer network. Messages indicating the telephone call is redirected to the computer network are inserted and the messages from the telephone call can then be redirect to the computer network.

20 Claims, 4 Drawing Sheets

METHOD AND SYSTEM FOR A REDIRECT REPEATER PROVIDING NETWORK ACCESS

BACKGROUND OF THE INVENTION

A. Field of the Invention

The present invention relates to a method and device for providing telephone subscribers access to computer networks. In particular, the present invention relates to providing digital telephone lines the ability to direct telephones calls to a computer network or service such as an Internet Service Provider ("ISP").

B. Description of the Related Art

Telephone service may be provided by a digital telephone line or Digital Loop Carrier ("DLC") system such as carried by a 1.544 Mbps T1 digital line allowing a number of different telephone subscriber lines to be multiplexed over a single set of copper wire telephone cable. The use of DLC systems enables a significant reduction in the amount of cable required to provide telephone service to subscribers. Rather than installing 24 separate pairs of copper wire between each subscriber location and the telephone company CO, 24 different subscriber lines can be time-division multiplexed onto a single connection of wires at a Remote Data Terminal ("RDT"). All 24 telephone connections can therefore be carried from the RDT to the telephone company central office ("CO") on a single set of wires. Thus, using a DLC system, only a single set of wires must be installed from the telephone central office to the RDT, and the full complement of 24 pairs of wires need only be run from the RDT to the subscribers' telephones. The reduction in copper facility required allows telephone service to be provided more cost effectively.

Today, an increasing number of telephone subscribers use their telephones to access a computer network such as the Internet. To access the computer network, computer users utilize a computer modem to establish a telephone connection over the Public Switched Telephone Network ("PSTN") to a dial-up telephone line providing access to the computer network. The PSTN is any of the networks, usually carrying telephony voice, fax, and modulated digital computer data, provided by AT&T, GTE, Regional Bell Operating Companies and other communication networks comprising multiple switching offices.

The dial-up access telephone line is typically connected to a Private Branch eXchange ("PBX") which switches telephone calls to a Remote Access Server ("RAS") providing telephone dial-in access to the computer network from the PSTN. The RAS typically includes a plurality of modems to receive incoming telephone calls from the PSTN telephone lines or trunks and a plurality of Network Interface Cards ("NICs") providing access to the desired computer network. The RAS interfaces and connects the plurality of modems to the plurality of NICs providing access to the computer network. A telephone call to access a computer network thus originates at an originating switching office, may be sent through the PSTN via one or more intermediate switching offices, to an end switching office, a PBX, and then to the RAS. At the end office, the incoming calls are received from the PSTN by the PBX and terminated to the RAS to provide access to the computer network.

There are a number of problems associated with using the PSTN to provide a data connection to access to a computer network such as the Internet or an intranet. A telephone connection routed through the PSTN passes through multiple switching offices, an end switching office, possibly a PBX, and then to the RAS to provide access to the computer network. Such transmission of data signals through multiple switching offices may require the signals carried by the telephone connection to be converted between various transmission formats through each switching office, significantly degrading the signal at each conversion and reducing its ability to accurately carry computer information. The routing of telephone calls through multiple switching offices in the PSTN may degrade the quality of the transmitted signal and reduce the bandwidth carrying capability of the connection. Thus, a device and method for proving a connection to the RAS without routing the telephone call through multiple PSTN switching offices is desirable.

The present invention address the problems of providing access to a computer network for telephone subscribers serviced from a DLC.

SUMMARY OF THE INVENTION

In accordance with an illustrative embodiment of the present invention, problems related to accessing a computer network from a telephone subscriber line are addressed. A system and method for providing telephone subscribers serviced from a DLC access to a computer network is described. The system includes a redirect repeater connected between a DLC and the PSTN switching equipment, the redirect repeater having the ability to recognize telephone calls to a computer network and redirect appropriate channels of the multiplexed DLC line to access a computer network. Thus, telephone calls accessing a computer network can be routed to the computer network without requiring the telephone call carry computer data through the PSTN.

The redirect repeater includes a line interface for receiving and transmitting messages between the DLC and the PSTN switch, a buffer for storing messages, and logic to control the redirecting of messages to a computer network interface. In the illustrative embodiment, the line interface is a T1 interface for receiving multiplexed T1 messages. The logic is preferably capable of recognizing a redirect signal indicating the telephone call is to be redirected to a computer network and controlling the redirect of telephone calls to a computer network interface. The logic may be implemented as digital hardware designed with electrical circuitry using application specific integrated circuitry ("ASIC"), custom gate arrays or programmable logic devices ("PLD") to implement the desired functions. In addition, the logic may be implemented with a computer processor with memory and programmed with software or firmware. The computer network interface may be a packet network interface accessing a computer network such as the Internet.

An illustrative method allows telephone subscribers serviced from a DLC to access to a computer network by monitoring the telephone line for a call origination message, buffering the call messages from the DLC, and recognizing a signal indicating the telephone call should be redirected to a computer network interface. Upon recognizing the telephone call is to be redirected, messages are inserted to indicate to the PSTN that the telephone call has been redirected to the computer network interface. The messages from the telephone subscriber are then directed from the DLC to the computer network.

The present embodiment provides telephone subscribers serviced from a DLC access to computer network without requiring the telephone call route the computer data through the PSTN. The computer data carried by the telephone call does not suffer the degradation of telephone signals that are carried through the PSTN, resulting in faster data transmission rates and speedier access to computer network services. In addition, routing telephone calls to the computer network through the repeater saves PSTN resources.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
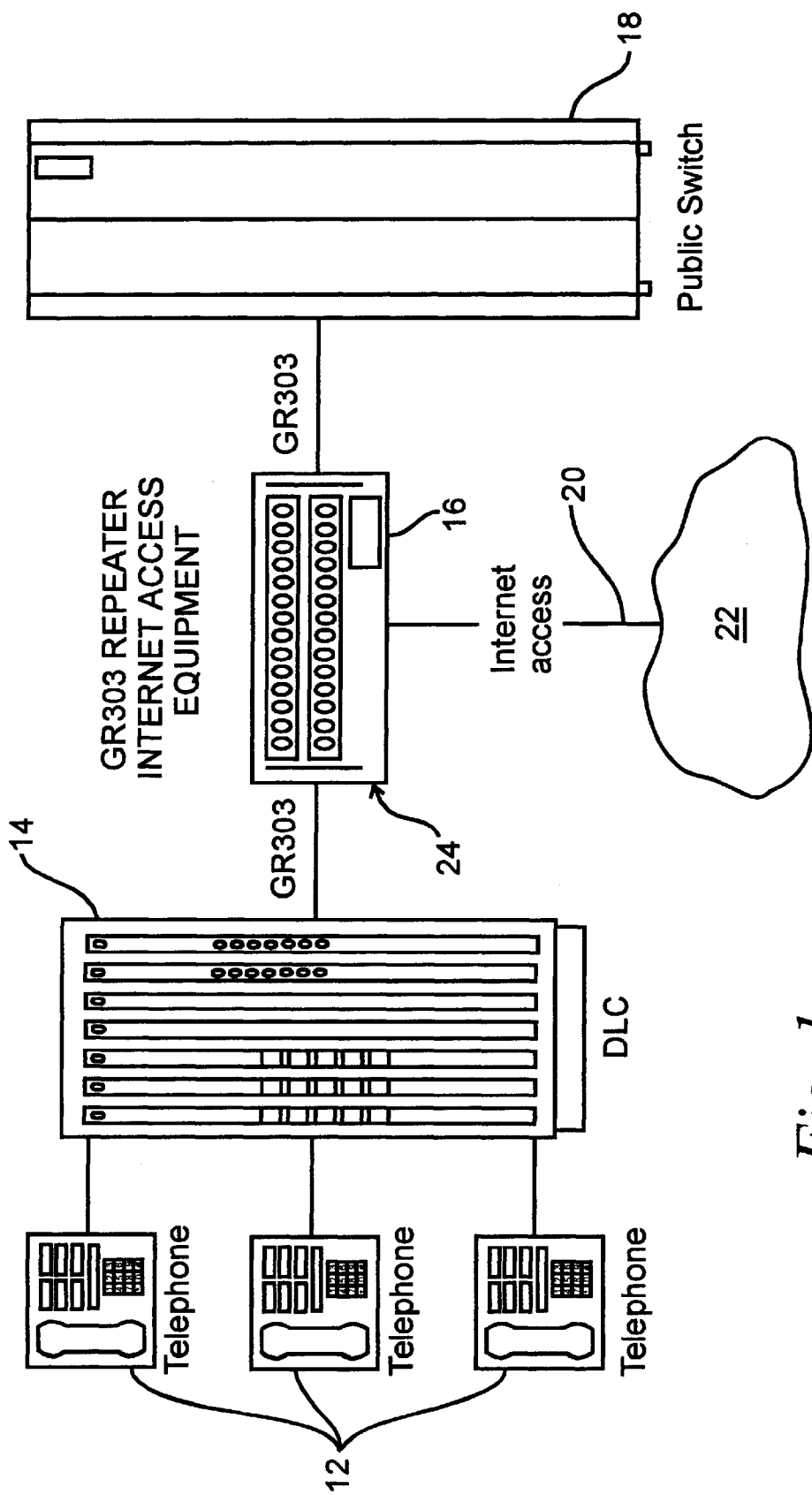
FIG. 1 shows a drawing of a system employing an illustrative embodiment of the invention.

FIG. 1 shows a system utilizing an illustrative embodiment in accordance with an aspect of the present invention. Telephone subscribers 12 may be provided telephone service from a digital loop carrier ("DLC") 14 system that multiplexes a plurality of subscriber telephone lines onto a single connection or pair of telephone cable wires. In North America a DLC 14 commonly uses a 1.544 Mbps T1 channel that provides 24 channels of voice grade circuits over a single copper connection. At the DLC 14 remote data terminal ("RDT"), a channel bank digitally samples and multiplexes 24 analog telephone subscriber lines onto a single pair of telephone cable. Typically, the channel bank uses a coder-decoder ("codec") to digitally sample and convert analog signals. A codec as used in North American telephone systems typically samples an analog signal at an 8 KHz rate and digitally represents the sampled signal as 8-bit pulse code modulation ("PCM") to form a 64 Kbps bandwidth connection for each channel. 24 64 Kbps channels are multiplexed to be carried by a single connection to the public switch or PSTN 18.

In the described embodiment, the T1 connection implements the GR-303 communication protocol as defined by Bellcore specifications and proposals. The GR-303 interface specification for DLC carrier systems define the interface between the DLC equipment and the PSTN switching office 18. It should be understood that DLC 14 may also be implemented by other digital transmission systems which provide multiplexed connections, such as pair-gain systems, subscriber loop multiplex ("SLM") and subscriber loop carrier ("SLC") SLC-96 systems. Although these systems may use a different form of voice modulation than T1 carrier systems (for example, delta modulation versus pulse code modulation) they both may use T1 repeaters for digital transmission at 1.544 Mbps. In addition, fiber optic carrier systems implementing the Synchronous Optical Network ("SONET") to multiplex a large number of telephone subscribers 12 onto a single fiber optic cable may also be used. DLC 14 equipment is available from a large number of suppliers of telecommunications equipment such as Nortel, Siemens, Lucent, Pulsecom, Siescor, Advanced Fibre Communcations, and DSC.

Although the telephone subscribers 12 are shown diagrammatically as telephones, it should be understood that the telephone subscribers 12 may have various types of customer premise equipment ("CPE") connected to the telephone line. For example, telephone subscribers 12 may have various home and office electronic devices such as answering machines, computer equipment, local area networks, fax machines, and other equipment utilizing access to a telephone line. In a particular embodiment, the telephone subscriber 12 may have a computer telephone modem to access the telephone line and establish a connection to a computer network 22. Telephone modems capable of allowing digital computers to interface and communicate signals over analog and digital telephone line are available from a number of manufacturers such as the 3Com Corporation.

In an illustrative embodiment, the redirect repeater 16 receives signals from a T1 line of the DLC 14 employing the GR-303 interface defined by Bellcore specifications. The redirect repeater 16 provides an interface to receive and transmit signals over the multiplexed T1 line and regenerate signals carried on the T1 line. The T1 signals carried on longer T1 spans may suffer from attenuation and decay. T1 regenerative repeaters function to amplify and regenerate the digital T1 signal to restore the T1 message signals over these long spans of telephone cable. Typically, regenerative repeaters are spaced every 6000 feet in a T1 span line and 3000 feet from the central office. In the illustrative embodiment, the T1 repeater need not provide a regenerative function and can be placed at the central office to provide the network redirect function.

During operation, the redirect repeater 16 of the present embodiment monitors messages from the DLC 16 for call origination messages such as a GR-303 call origination message indicating a telephone subscriber is originating an outgoing telephone call. Upon detection of a call origination message from a telephone subscriber 12, the redirect repeater 16 receives and delays messages from the telephone subscriber 12. The redirect repeater 16 delays messages until it determines whether the telephone call is carrying computer data to a computer network 22 or the telephone call is an ordinary voice telephone call to be carried by the PSTN 18. For ordinary voice telephone calls carried by the PSTN 18, the redirect repeater 16 simply passes through or repeats messages from the telephone subscriber 12 to the PSTN or public switch 18. For telephone calls to the computer network, the redirect repeater 16 establishes a connection and redirects messages from the telephone subscriber 12 to the computer network 22.

In an illustrative embodiment, the redirect repeater 16 determines that a telephone call is carrying computer data to a computer network 22 by recognizing a redirect signal 24. The redirect signal 24 indicates that the redirect repeater 16 may switch the telephone call carried on a channel of the multiplexed DLC 14 line to access the computer network 22. The redirect signal 24 can be provided and recognized in many different ways. In an illustrative embodiment, the redirect signal 24 can be embodied as a string of digits represented by the dual tone multifrequency ("DTMF") signals that are provided by a telephone keypad. For example, the appropriate string of digits may be prearranged and agreed upon by the public switching equipment 18. This type of redirect signal 24 can be may be supported by a common specification such as the Bellcore GR-303 specification. Possible digit strings for the redirect signal 24 may include:

Seven digit local telephone numbers

Special combination of DTMF*, #, and digits

Ten digit national numbers

More than ten digit number (credit card calls, special toll access numbers)

Of course, other type of signaling tones such as the Multi-Frequency ("MF") trunk signaling may also be used with the present embodiment. In addition, the redirect signal 24 can be a unique signature signal or tone produced by a compatible modem such as a 3Com Corporation modem. In this case, the computer modem and redirect repeater 16 must also be compatible and agree on the particular characteristics of the redirect signal 24. The signature signal redirect signal 24 may be one or multiple voice band tones created by a 3Com modem when it is applying the off-hook signal or during the off-hook signal while originating a telephone call. Any agreed type of signature signal may be used as a redirect signal 24 as long as it is unique enough not to be easily confused with other signals that may commonly be present on a telephone line. Preferably, the redirect repeater 16 is capable of recognizing a number of different types of redirect signals 24.

After recognizing the redirect signal 24, the redirect repeater 16 inserts messages to send to the PSTN switch 18 to indicate to the switch 18 that the redirect repeater 16 will redirect the telephone call to the computer network 22. The inserted messages inform the switch 18 and allow the switch 18 to maintain call record information related to the status of the telephone call. Thus, the switch 18 records the telephone call as redirected by the redirect repeater 16 to the computer network 22 and the telephone subscriber 12 as being busy. Incoming telephone calls to the telephone subscriber 12 connected to the computer network 22 will thus receive a busy signal. Other calling features such as call forwarding, transfer to voice mail, or call waiting will also still operate as with conventional telephone GR-303 protocol. For example, switch-hook level messages may be available for different voice calls. The inserted messages to the switch 18 will depend on the particular protocol such as the DLC protocols (GR-303, TR-57, TR-8, V.52) that preserves the above-mentioned services, that can be collectively referred as CLASS services. Of course, the PSTN switch 18 should be programmed to be capable of recognizing the inserted messages.

After inserting messages to the public switch 18, the messages related to the telephone call carrying computer data traffic can be redirected to the computer network 22. The computer network 22 may be any of many private computer networks, the Internet or an intranet. The computer network can be accessed through other types of connections such as a T1 trunk, PRI interface or a public or private packet data network such as Frame Relay or ATM.

Figure 2:
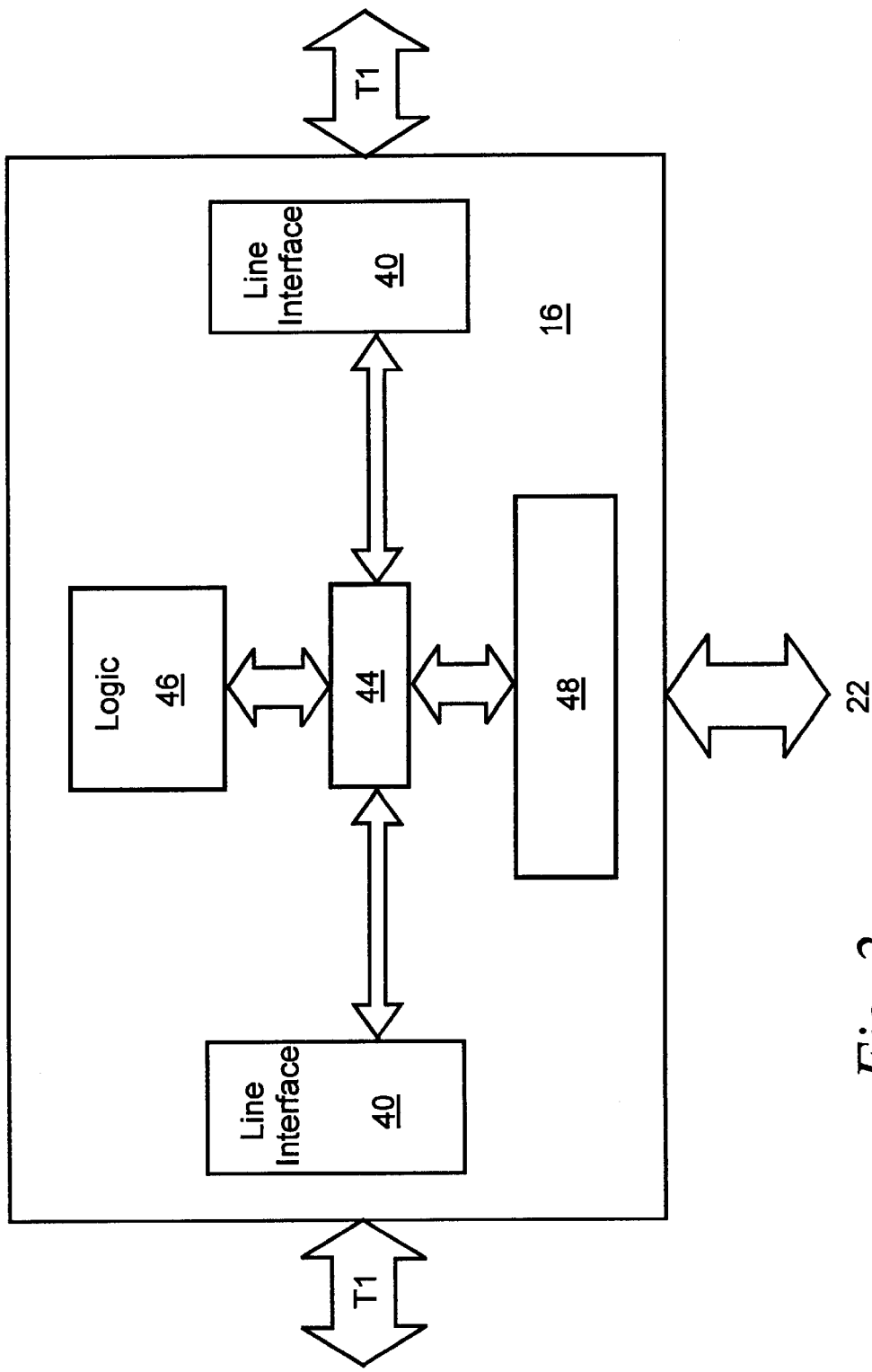
FIG. 2 shows a block diagram of an embodiment of the redirect repeater used in the system of FIG. 1.

Referring now to FIG. 2, the redirect repeater 16 of the present embodiment may provide the features of a regenerative repeater including equalization, clock recovery, pulse detection, and transmission. Regenerative repeaters typically provide automatic line build out, approximately 0 to 36 dB dynamic range, noise and cross talk filtering, and loop back features. Although typical regenerative repeaters are typically environmentally hardened to withstand extreme outdoor weather conditions, the repeater 16 of the present embodiment may be installed within the PSTN central office environment without hardening for extreme environmental requirements.

The redirect repeater 16 of the present embodiment may include a pair of line interfaces 40, 42, a memory buffer 44, logic 46, and a computer network interface 48. In the illustrative embodiment, the line interfaces 40, 42 are T1 interfaces receiving and transmitting multiplexed 24-channel T1 lines implementing the GR-303 interface. Although the T1 interface is shown as a pair of interfaces, it may be implemented as a single component. In the exemplary embodiment, the T1 interface is a 4-wire PCM link with ESF framing with B8ZS and in conformance with Belcore specification GR-303 -core section 4.

Preferably, the logic 46 controls the overall operation of the redirect repeater 16 as well as the redirection of multiplexed channels of the T1 line to the computer network interface 22. In an illustrative embodiment, the logic 46 monitors the T1 lines through the T1 line interface 40 for call origination messages from idle telephone subscribers. After detecting a call origination message, the logic 46 moves incoming messages from the T1 line interface 40 to a memory buffer 44 for temporarily storing the messages. The memory buffer 44 may include RAM memory and be managed as a queue or other computer data structure for storing incoming messages.

The logic 46 may also include the appropriate electronics or software to recognize the redirect signal 24. Thus, the logic 46 may be implemented in accordance with the particular redirect signal 24. For example, the redirect signal 24 may comprise a unique sequence of DTMF digits as previously described. The logic 46 may thus include appropriate electronics such as a DTMF decoder to decode the DTMF digits and logic circuitry such as a comparator to compare the decoded DTMF digits to the redirect signal 24. If the redirect signal 24 is a signature signal at a unique frequency output by a compatible 3Com modem, the logic 46 includes appropriate circuitry to recognize the particular signal as can be implemented by those skilled in the art.

After recognizing the redirect signal 24, the logic 46 preferably moves the messages stored in the memory buffer 44 to the appropriate T1 line interface 40, 42 or the computer network interface 48. In case the redirect signal 24 is not recognized, the call is treated as an ordinary voice telephone call and the logic 46 directs the call messages to be repeated from one T1 line interface to the other. If the redirect repeater 16 recognizes the redirect signal 24, it directs the telephone call to a computer network 22. The logic 46 directs the messages from the multiplexed T1 channel of the telephone subscriber accessing the computer network to the computer network interface 48. To redirect messages to the computer network, the logic 46 may implement functions similar to the a Digital Cross-Connect Switch ("DCS") and a drop-and insert or add-drop multiplexer ("ADM"), as will be described further below.

The logic 46 can be implemented in a variety of different ways to achieve the desired functions including digital hardware design using electrical circuitry, discrete combinational logic, ASIC, custom gate arrays, PLDs or PLAs. A variety of software or firmware can also be used to implement the embodiments described herein. For example, the logic 46 can be implemented as computer processor with random access memory ("RAM") and read-only memory ("ROM") for storing computer programs. The processor may be a general-purpose microprocessor or a digital signal processor such as the Texas Instruments TMS320C548 or combination of general processor, digital signal processors and logic. The described functions may be implemented by computer programmers skilled in high-level C or C++ programming languages. The software may be compiled, stored, and executed in preferably in firmware or even a disk-based operating system. In another embodiment, the described functions can be implemented in machine or assembly language.

In an illustrative embodiment, a digital signal processor can be used to determine DTMF digits with the appropriate digits or sequence of digits corresponding to the proper redirect signal 24. The logic 46 preferably includes electronics hardware such as a DTMF decoder to detect the redirect signal 24. The processor can read the decoded DTMF digits to determine if they are the correct sequence of digits corresponding to the appropriate redirect signal 24. Alternatively, if the redirect signal is embodied as a signature signal sent from a compatible modem, the logic 46 would include hardware to recognize the signature signal such as a bandwidth pass filter with appropriate detection logic. In addition, the digital signal processor can determine whether the redirect signal 24 is the proper signal to initiate the redirect function as can be implemented by those skilled in the art.

The processor also moves messages between the line interfaces 40, 42 to pass through messages from the DLC 14 to the public switch 18. The processor reads the appropriate channel of the telephone line from one T1 line interface 40 and passes the data onto the appropriate channel of the corresponding T1 line interface 42. Alternatively, dedicated electronics hardware (not shown) for receiving T1 signals, conditioning the signals, and transmitting T1 signals can be used to amplify and repeat the T1 signal. The redirect repeater 16 may use an integrated circuit to provide the amplification and line conditioning functionality of T1 repeaters such as used in devices available from companies such as Nortel, Lucent and other telecommunications equipment manufacturers.

In addition, the logic 46 or processor provides a switching function for redirecting the appropriate multiplexed channel of the T1 line corresponding to the telephone subscriber accessing the computer network 22. In the illustrated embodiment, processor implements the ability to drop the appropriate T1 channel from the DLC telephone subscriber to be routed to the computer network, analogous to the functionality of a digital cross-connect or ADM. The processor is programmed to split out a DLC subscriber's individual T1 channel and route messages from that subscriber' channel to the computer network access. In this manner, the processor redirects messages from subscribers wishing to access the computer network to the computer, rather than repeating messages to the PSTN. Preferably, the DCS or ADM switch functionality may be implemented in logic or software run by the processor. For example, to implement the redirect function the processor may read the appropriate messages from the buffer 44 or T1 interface and output messages to the computer network interface 48. The processor operates bi-directionally to implement two-way communications. The processor may simply redirect the T1 channel to another T1 or PRI trunk providing a trunk or PSTN signaled connection to a gateway accessing a computer network. Alternatively, the processor may also provide signal interworking to translate the T1 channel to another format, such as an Ethernet, Token Ring, ATM or Frame Relay packet format which can be switched to a gateway accessing the computer network.

The computer interface 48 provides an interface accessing the computer network 22 such as the Internet. The computer network interface may vary according to the particular format of the repeater logic 46. Accordingly, the computer network interface can be any wide area network ("WAN") interface such as T1, T3, SONET, ATM, Frame Relay or local area network ("LAN") interface such as Ethernet, Token Ring, ATM, FDDI or the like.

The present embodiment provides telephone subscribers serviced from a DLC improved access to a computer network. The redirect repeater 16 provides access to the computer network 22 that avoids routing telephone connections through the PSTN 18. Thus, the signal does not suffer significant degradation from transmission through the PSTN. In addition, avoiding routing the telephone call through the PSTN conserves PSTN network resources.

Figure 3:
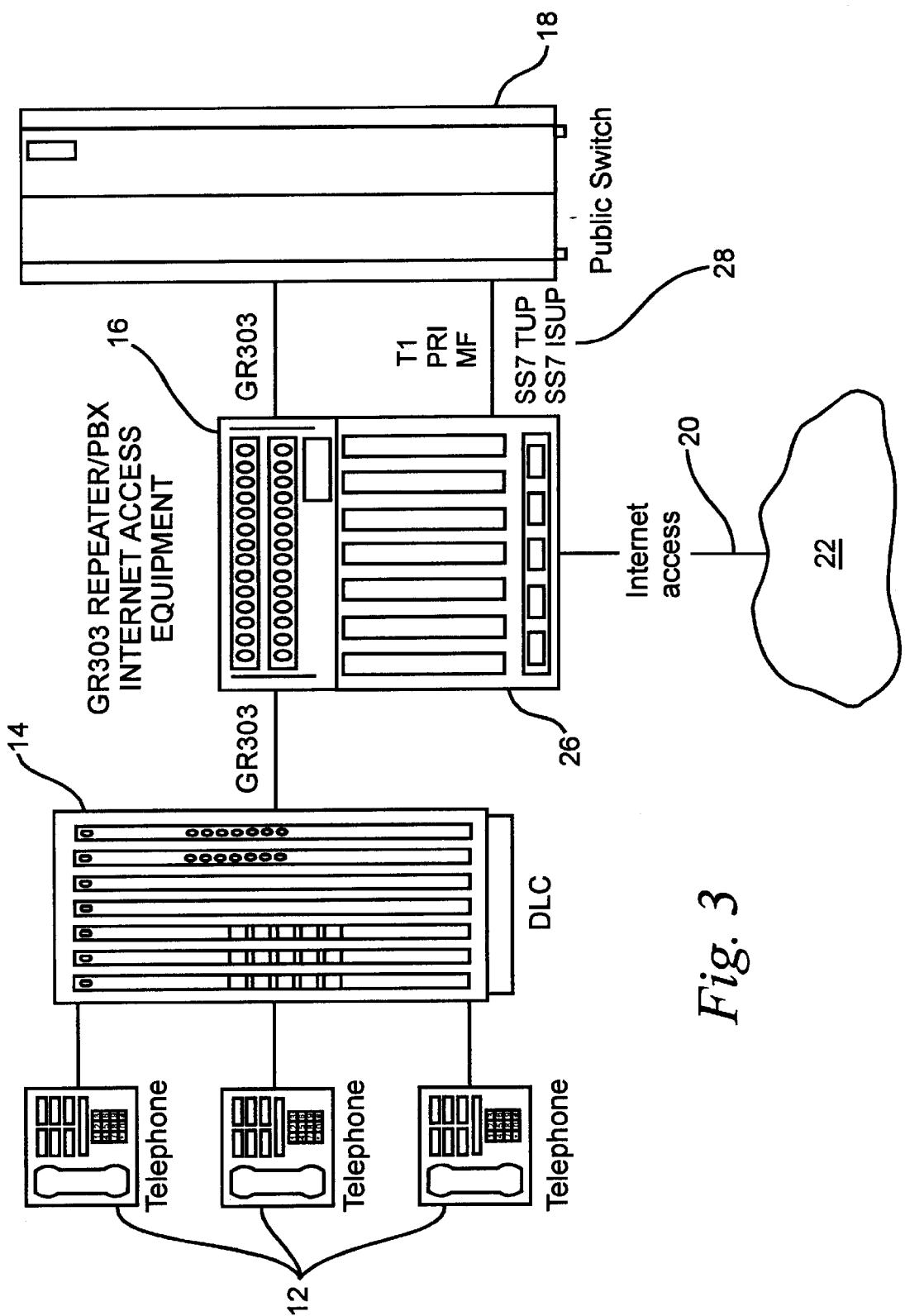
FIG. 3 shows an alternate embodiment of the system of FIG. 1.

Referring now to FIG. 3, described is another illustrative embodiment according to another aspect of the invention using the redirect repeater 16 with remote access server ("RAS") functionality. RAS 26 typically provides access to the computer network 22 for telephone calls from the PSTN 18. Ordinarily, the RAS 26 terminates a plurality of telephony connections from the PSTN 18 in the form of telephone lines or telephony trunks 28. Telephony trunks or telephone lines 28 provide access to the RAS 26 from the PSTN 18. Typically the RAS 26 is connected to the PSTN 18 as a Private Branch exchange ("PBX") capable of handling a plurality of incoming telephone calls from the PSTN. Larger computer networks with great numbers of remote dial-in computer users will preferably use high-capacity telephony trunks 28 such as the 24 channel 1.544 Mbps T1 trunk used in North America, to provide a large volume of dial-in capacity to the computer network 22. Such trunks may be R1, Multi-Frequency ("MF") or Signaling System Number 7 ("SS7") signaling trunks. In other countries, a 2.048 Mbps E1 trunk may be used in place of the T1 trunk. Such trunks may use R2 or Multi-Frequency Compelled ("MFC") signaling. The "R" stands for Regional standard recommendation and the "2" is the second standard. R2 is commonly used over trunks in an international telecommunications system. Smaller computer networks with fewer numbers of remote dial-in users may use a lower capacity Primary Rate Interface ("PRI") such as a Business 1 ("B1") or an Integrated Service Digital Network ("ISDN") telephone line. It should be understood that the telephone trunks or lines 28 connected to the RAS 26 may be connected to different switching offices throughout the PSTN 18.

The RAS 26 typically includes a plurality of modems to receive a plurality of incoming telephone calls from the PSTN telephone lines or trunks and/or a plurality of Network Interface Cards ("NICs") to provide access to the computer network 22. The RAS 26 interfaces and connects the plurality of modems to a plurality of NICs interfacing the computer network. Typically, a number of different types of modems and NICs are provided to accommodate different protocols, types of networks, and interfaces as necessary.

In addition to modems for receiving incoming telephone access calls from the PSTN, the RAS 26 of the present embodiment preferably includes an interface to the redirect repeater 16. Preferably, the interface is a digital bus interface, such as a PCM bus, appropriate for communication between the repeater 16 and the RAS 26. The redirect repeater 16 ADM function redirects channels of the DLC lines by dropping the appropriate T1 channel and may provide a translation from the T1 message protocol format to an appropriate format for interfacing with the RAS 26. In this embodiment, the logic 46 (FIG. 2) is programmed to implement the translation from the DLC T1 protocol format, such as GR-303, to a common data format with the RAS 26 such as PCM bus interface. Alternatively, a packet network interface or other types of digital interfaces, such as a data interface, may be used to connect the redirect repeater 16 to the RAS 26 as known to those skilled in the art.

For ordinary telephone calls, the DLC 14 and PSTN 18 provides the telephone subscriber 12 Plain Old Telephone Service ("POTS"). The redirect repeater 16 merely connects the telephone subscriber 12 through to the switching office 18, having no effect on ordinary POTS.

Telephone subscribers accessing the computer network 22 dial the telephone number associated with one of the plurality of telephony trunks or lines 28 terminated at the RAS 26. Telephone subscriber 12 uses a telephone modem to dial the telephone trunk/lines 28 providing access to the computer network 22 from the PSTN 18. The telephone modem may be any one of x2, V.34, V.90 protocol modems or other high-speed telephone modems can be used. As previously described, the telephone modem may be equipped or programmed to send a redirect signal while originating telephone calls to a dialup computer network. It is envisioned that as higher speed communication protocols (for example, greater than 56 Kbytes/sec) are developed, they will be utilized with the present embodiment to achieve high-speed data communication. The PSTN 18 routes the telephone call to the telephone trunks/line 28 terminated at the RAS 26. At the telephone trunks/line 28 of the RAS 26, the call is answered and the calling party telephone number is identified. In a preferred embodiment, the telephone/trunk lines 28 have calling party number or automatic number identification ("ANI") capability to determine the telephone number originating the call to the telephone line/trunk 28. If ANI is not available, caller identification can be used.

In the alternate embodiment, several methods can be used to determine whether calls should be redirected to the computer network 22. In an illustrative embodiment, the RAS 26 or redirect repeater 16 maintains an access table identifying telephone numbers that are provided telephone service through the redirect repeater 16 accessible to the RAS 28. Preferably, the access table is implemented in the form of a computer data structure such as an array or linked list pointer table. Such an access table and its use is also described in co-pending application U.S. Ser. No. 09/067,134 assigned to the same assignee as this application, which is fully incorporated by reference. The ANI of incoming telephone calls to the RAS 26 are compared to the telephone subscribers that are listed in the access table. If the telephone subscriber 12 number is listed in the access table, the redirect repeater 16 can redirect the telephone call to the computer network through the RAS 26. Listing the subscriber telephone 12 number in the access table indicates that the subscriber 12 is serviced through the redirect repeater 16 which is capable of access the computer network 18 through the RAS 26.

The redirect repeater 16 can operate as previously described. In this embodiment, however, the redirect signal may be provided based on the access table of the RAS 26 when the ANI telephone number of an incoming call to the RAS 26 is a telephone number in the access table. The redirect repeater 16 can then switch the telephone call to the computer network 22 through the RAS 26.

In another embodiment of the invention, a DLC system with higher sampling rate and higher speed codecs is provided to allow high-speed access to the computer network. For example, the DLC may use higher speed codecs sampling at two, three, four or eight times the 8 KHz T1 sampling rate can be used to provide bit rates greater than 64 Kbps. The DLC may use a fiber optic connection to support the higher data rates. It can be seen by those of skill in the art that the redirect repeater can use corresponding higher speed circuitry to provide redirect to a computer network at higher data rates exceeding 64 Kbps.

Figure 4:
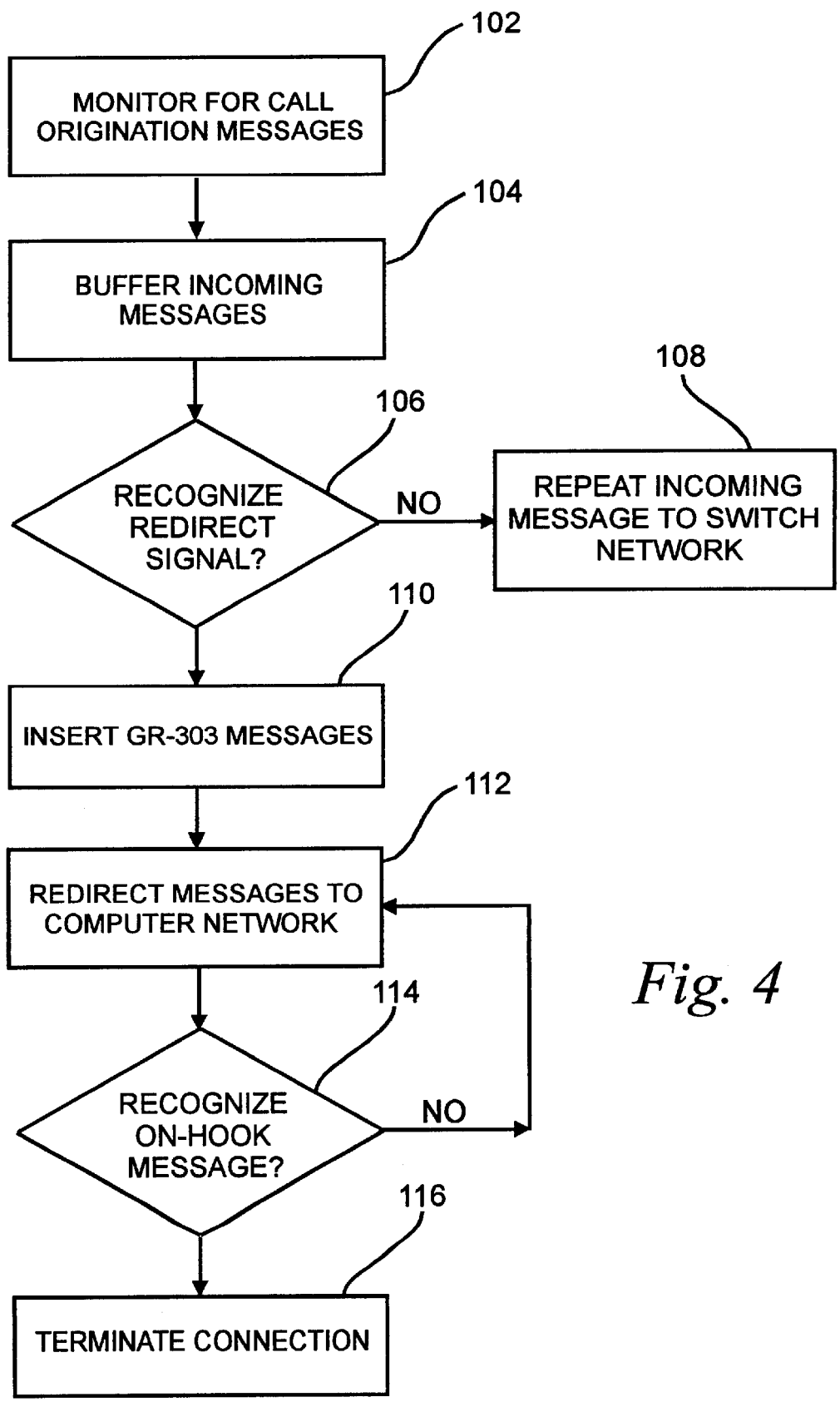
FIG. 4 shows an exemplary flow chart embodying an illustrative method in accordance with the principles of the system of FIG. 1.

FIG. 4 shows an illustrative embodiment of a method embodying an aspect of the present invention. At step 102, the DLC is monitored for call origination messages. Call origination may be signaled by the telephone subscriber off-hook condition. In an illustrative example, the DLC using the GR-303 protocol will translate the off-hook condition to a message for the switch to provide dial tone. The DLC can be monitored for an off-hook or call origination message as defined by GR-303. Of course other types of protocols using different types of call messages can be used.

At step 104, after detecting a call origination message, subsequent incoming messages from the telephone subscriber are delayed or stored in a buffer until the it can be determined that the telephone call is to a computer network. At step 106, while messages are being delayed, the redirect signal is recognized. As previously described, the redirect signal can take various forms and the recognition is appropriate to recognize the particular redirect signal that is implemented. At step 108, if the redirect signal is not present, the telephone call is handled as an ordinary telephone call through the PSTN. Messages from the telephone subscriber are accordingly forwarded or repeated to the switch.

At step 110, the redirect signal has been recognized at step 106, indicating that the telephone call is a call that can access the computer network without routing through the PSTN. Messages are inserted to signal to the switch that the call is being redirected to the computer network. The messages can be implemented as a computer redirect message that is agreed upon by the DLC and the switch. Preferably, the message is incorporated into the GR-303 protocol and programmed into the switching equipment.

At step 112, the messages from the telephone subscriber are redirected to the computer network. The buffered messages from the telephone subscriber are sent on to the computer network. At step 114, subsequent messages from the telephone subscriber are extracted from the T1 lines and switched to the computer network.

At step 114, a call termination message indicating the caller has ended the telephone call is checked. If the call termination message is recognized, the call is terminated. At step 116, messages indicating the call is to be terminated are sent to the switch and the connection to the computer network can be terminated. If the call termination message is not recognized, messages are continued to be redirected to the computer network at step 112.

While the present embodiment has been described as a method, it can readily be implemented as hardware in the form of a custom gate array or an application specific integrated circuit ("ASIC"). A variety of software, firmware, and hardware can be used to implement the embodiments described herein. For example, the described methods may be implemented in a high-level C or C++ programming language by those of skill in the art.

The method may embodied in the form of executable code running on a processing system with a high-speed Central Processing Unit ("CPU") and a memory system as previous discussed. In the preferred embodiment, a special-purpose digital signal processor ("DSP") is employed, but it should be understood that a general-purpose processor may also be suitable in the present embodiment. The present embodiment preferably includes a software module as a set of computer executable software instructions. The software instructions are executed as data bits by the CPU with a computer memory system. The software may be compiled, stored, and executed in either firmware or a disk-based operating system. In a representative embodiment, the described software is implemented in assembly language to run on a digital signal processor. Of course, a microcontroller or a personal computer may also be suitable. The software may be stored and executed in either firmware or a disk-based computer operating system.

In accordance with the practices of persons skilled in the art of computer programming, the present invention is described with reference to acts and symbolic representations of operations that are performed by the computer processing system, unless indicated otherwise. Such acts and operations are sometimes referred to as being "computer-executed", or "CPU executed." It will be appreciated that any symbolically represented operations or acts described include the manipulation of electrical signals by the CPU. The electrical system represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained also include physical locations that have particular electrical, magnetic, optical, or organic properties corresponding to the stored data bits.

The data bits may also be maintained on a computer readable medium including magnetic disks, optical disks, organic disks, and any other volatile or (e.g., Random Access memory ("RAM")) non-volatile (e.g., Read Only Memory ("ROM")) storage system readable by the CPU. The computer readable medium includes cooperating or interconnected computer readable media, which exist exclusively on a processing system or is distributed among multiple interconnected processing systems that may be local or remote to the processing system.

Likewise, digital hardware design using electrical circuitry can be designed to using ASICs, custom gate arrays or programmable logic arrays to implement the desired functions.

It should be understood that the programs, processes, methods and apparatus described herein are not related or limited to any particular type of computer or network apparatus (hardware or software), unless indicated otherwise. However, the present invention is not limited to these network devices and computer networks, and other network devices and computer networks could also be used. Various types of general purpose or specialized computer apparatus may be used with or perform operations in accordance with the teachings described herein.

Both the foregoing general description and the following detailed description are exemplary and explanatory and are intended to provide further explanation of the invention as claimed. Numerous modifications and variations are possible. It is intended that the foregoing detailed description be regarded as illustrative rather than limiting. It is the following claims, including all equivalents, which are intended to define the scope of this invention.

We claim:

1. A repeater for directing telephone calls from a digital loop carrier system carrying a plurality of telephone subscriber lines to a computer network, the repeater comprising:

a line interface for receiving messages from telephone subscriber lines on the digital loop carrier system;

a redirect signal for indicating to the repeater that messages from the digital loop carrier system are directed to the computer network;

logic for detecting the redirect signal and in response directing messages to the computer network interface; and a computer network interface which transfers messages between the repeater and the computer network;

wherein the repeater provides a connection from telephone subscriber lines on the digital loop carrier system to the computer network in response to the redirect signal.

2. The device of claim 1 wherein the digital loop carrier system comprises a T1 carrier system.

3. The device of claim 1 wherein the digital loop carrier system comprises a fiber optic transmission system.

4. The device of claim 1 wherein the messages comprise GR-303 messages.

5. The device of claim 1 wherein the computer network comprises a packet-switched network.

6. The device of claim 1 wherein the repeater further comprises:

a buffer for buffering messages received from the telephone subscriber line; and logic for inserting messages to indicate that the telephone call is being redirected to the computer network.

7. The device of claim 6 wherein the logic for inserting messages comprises a programmable logic device.

8. The device of claim 1 wherein the redirect signal comprises a string of dual tone multi-frequency digits.

9. The device of claim 1 wherein the redirect signal comprises a unique signature frequency tone.

10. The device of claim 1 wherein the repeater is installed within a telephone central office.

11. A redirect repeater for directing telephone calls from a digital loop carrier system to a computer network comprising:

a line interface for receiving messages from telephone subscriber lines on the digital loop carrier system;

a redirect signal for indicating to the repeater that the messages from the digital loop carrier system are directed to the computer network;

logic for determining whether the messages stored in the buffer are directed to the computer network interface in response to the redirect signal and for inserting messages to indicate that the telephone call is being redirected to the computer network;

a buffer for buffering messages received from the telephone subscriber line; and a computer network interface which transfers messages between the redirect repeater and the computer network;

wherein the redirect repeater provides a connection from telephone subscriber lines on the digital loop carrier system to the computer network in response to the redirect signal.

12. A method for processing telephone calls from a digital loop carrier to provide access to a computer network comprising:

monitoring the digital loop carrier for call origination messages indicating a telephone subscriber is originating an outgoing telephone call;

buffering messages from the originating telephone call;

recognizing a signal indicating the telephone call is directed to the computer network;

inserting messages indicating the telephone call is to be directed to the computer network; and redirecting messages from the telephone call to the computer network.

13. The method of claim 12 wherein the messages from the telephone call comprise GR-303 messages.

14. The method of claim 12 wherein the signal indicating the telephone call is directed to the computer network is a sequence of dual-tone multi-frequency signals.

15. A computer readable medium comprising instructions for causing a central processing unit to execute the method of claim 12.

16. An system for directing telephone calls from a digital loop carrier system carrying a plurality of telephone subscriber lines to a computer network, the system comprising:
- a repeater for receiving messages from a telephone call from the digital loop carrier system;
- a redirect signal for indicating to the repeater that the messages from the telephone subscriber line are directed to the computer network; and
- a remote access server providing a connection to the computer network;
- wherein the repeater redirects channels of the digital loop carrier system to the remote access server in response to the redirect signal.

17. The system of claim 16 further comprising an access table comprising a list of telephone subscribers numbers which may access the computer network through the repeater and remote access server.

18. The system of claim 17 wherein the redirect signal is generated in accordance with the telephone subscriber number being listed in the access table.

19. The system of claim 16 wherein the messages comprise GR-303 messages.

20. The system of claim 16 wherein the computer network comprises a packet-switched network.

* * * * *

UNITED STATES PATENT AND TRADEMARK OFFICE
Certificate

Patent No. 6,289,097 B1

Patented: September 11, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Thomas B. Gregory, Trout Valley, IL; Eric V. Erickson, Mt. Prospect, IL; James A. Renkel, Warrenville, IL; Christopher J. Rozmqn, Kildeer, IL; John M. Sullivan, Lisle, IL; and Mustafa S. Yucebay, Naperville, IL.

Signed and Sealed this Eighth Day of April 2003.

CURTIS KUNTZ
*Supervisory Patent Examiner*
Art Unit 2643